United States Patent
Johnson et al.

(10) Patent No.: US 11,372,851 B2
(45) Date of Patent: *Jun. 28, 2022

(54) SYSTEMS AND METHODS FOR RAPID DATA ANALYSIS

(71) Applicant: Scuba Analytics, Inc., Redwood City, CA (US)

(72) Inventors: Robert Johnson, Palo Alto, CA (US); Lior Abraham, San Francisco, CA (US); Ann Johnson, Palo Alto, CA (US); Boris Dimitrov, Portola Valley, CA (US); Don Fossgreen, Scotts Valley, CA (US)

(73) Assignee: Scuba Analytics, Inc., Redwood City, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 16/895,190

(22) Filed: Jun. 8, 2020

(65) Prior Publication Data
US 2020/0311064 A1    Oct. 1, 2020

Related U.S. Application Data

(63) Continuation of application No. 15/645,698, filed on Jul. 10, 2017, now Pat. No. 10,713,240, which is a
(Continued)

(51) Int. Cl.
*G06F 16/242* (2019.01)
*G06F 16/27* (2019.01)
(Continued)

(52) U.S. Cl.
CPC ...... *G06F 16/2425* (2019.01); *G06F 16/2462* (2019.01); *G06F 16/2471* (2019.01);
(Continued)

(58) Field of Classification Search
CPC .................................................. G06F 16/278
See application file for complete search history.

(56) References Cited

U.S. PATENT DOCUMENTS

| | | |
|---|---|---|
| 5,335,345 A | 8/1994 | Frieder et al. |
| 5,668,987 A | 9/1997 | Schneider |

(Continued)

FOREIGN PATENT DOCUMENTS

| | | |
|---|---|---|
| JP | 10232804 | 9/1998 |
| JP | 10-26248 | 10/1998 |

(Continued)

OTHER PUBLICATIONS

Ekanayake, Jaliya, et al. "Twister: a runtime for iterative mapreduce." Proceedings of the 19th ACM international symposium on high performance distributed computing. 2010. (Year: 2010).*

*Primary Examiner* — William Spieler
(74) *Attorney, Agent, or Firm* — Jeffrey Schox; Diana Lin

(57) ABSTRACT

A method for rapid data analysis includes receiving and interpreting a first query operating on a first dataset partitioned into shards by a first field; collecting a first data sample from a first set of data shards; calculating a first result to the first query based on analysis of the first data sample; and partitioning a second dataset into shards by a second field based on the first result.

20 Claims, 4 Drawing Sheets

Related U.S. Application Data continuation of application No. 15/077,800, filed on Mar. 22, 2016, now Pat. No. 9,734,202, which is a continuation of application No. 14/644,081, filed on Mar. 10, 2015, now Pat. No. 9,323,809.

(60) Provisional application No. 61/950,827, filed on Mar. 10, 2014.

(51) Int. Cl.
    *G06F 16/2458* (2019.01)
    *G06F 16/2453* (2019.01)
    *G06F 16/2455* (2019.01)

(52) U.S. Cl.
    CPC .. *G06F 16/24545* (2019.01); *G06F 16/24554* (2019.01); *G06F 16/278* (2019.01)

(56) References Cited

U.S. PATENT DOCUMENTS

| | | |
|---|---|---|
| 5,893,090 A | 4/1999 | Friedman et al. |
| 5,978,791 A | 11/1999 | Farber et al. |
| 6,606,618 B2 | 8/2003 | Delo |
| 6,775,681 B1 | 8/2004 | Bellamkonda et al. |
| 7,010,521 B2 | 3/2006 | Hinshaw et al. |
| 7,213,012 B2 | 5/2007 | Jakobsson et al. |
| 7,587,394 B2 | 9/2009 | Chang et al. |
| 7,617,235 B2 | 11/2009 | Srinivasan et al. |
| 8,239,383 B2 | 8/2012 | Santosuosso |
| 8,356,050 B1 | 1/2013 | Olston et al. |
| 8,468,132 B1 | 6/2013 | ONeill et al. |
| 8,484,162 B2 | 7/2013 | Rah et al. |
| 8,751,460 B1 | 6/2014 | Annapragada et al. |
| 8,756,209 B2 | 6/2014 | Do et al. |
| 8,768,870 B1 | 7/2014 | Corrado et al. |
| 8,825,752 B1 | 9/2014 | Madhavan |
| 8,856,169 B2 | 10/2014 | Zhang et al. |
| 8,868,580 B2 | 10/2014 | Gould et al. |
| 8,903,973 B1 | 12/2014 | Hindawi et al. |
| 8,935,318 B1 | 1/2015 | Konerding et al. |
| 8,965,915 B2 | 2/2015 | Ganti et al. |
| 9,053,167 B1 | 6/2015 | Swift et al. |
| 9,054,864 B2 | 6/2015 | Bosson |
| 9,128,877 B1 | 9/2015 | Cousins |
| 9,171,104 B2 | 10/2015 | Gotz et al. |
| 9,195,826 B1 | 11/2015 | Fang et al. |
| 9,239,851 B1 * | 1/2016 | Messer ................ G06F 16/278 |
| 9,246,932 B2 | 1/2016 | Gorny et al. |
| 9,251,097 B1 | 2/2016 | Kumar et al. |
| 9,280,591 B1 | 3/2016 | Kharatishvili et al. |
| 9,323,758 B1 | 4/2016 | Stacey et al. |
| 9,405,763 B2 | 8/2016 | Prahlad et al. |
| 9,411,862 B1 | 8/2016 | Wang et al. |
| 9,424,351 B2 | 8/2016 | Risvik et al. |
| 9,465,823 B2 | 10/2016 | Shergill et al. |
| 9,774,401 B1 | 9/2017 | Borrill |
| 9,900,337 B2 | 2/2018 | Gorny et al. |
| 10,009,732 B1 | 6/2018 | Rice et al. |
| 10,148,548 B1 | 12/2018 | Griffin et al. |
| 10,198,492 B1 | 2/2019 | O'Neill et al. |
| 10,268,835 B2 | 4/2019 | Beckman et al. |
| 10,331,695 B1 | 6/2019 | Stickle |
| 2001/0032199 A1 | 10/2001 | Delo |
| 2002/0178151 A1 | 11/2002 | Chaudhuri et al. |
| 2003/0195872 A1 | 10/2003 | Senn |
| 2003/0212668 A1 | 11/2003 | Hinshaw et al. |
| 2004/0143756 A1 | 7/2004 | Munson et al. |
| 2004/0225639 A1 | 11/2004 | Jakobsson et al. |
| 2004/0230764 A1 | 11/2004 | Merchant et al. |
| 2004/0243568 A1 | 12/2004 | Wang et al. |
| 2005/0055254 A1 | 3/2005 | Schmidtberg et al. |
| 2005/0065914 A1 | 3/2005 | Chang et al. |
| 2005/0114369 A1 | 5/2005 | Gould et al. |
| 2005/0182762 A1 | 8/2005 | Srinivasan et al. |
| 2005/0223019 A1 | 10/2005 | Das et al. |
| 2006/0059439 A1 | 3/2006 | Hao et al. |
| 2006/0069955 A1 | 3/2006 | Oka et al. |
| 2006/0224793 A1 | 10/2006 | Purlia |
| 2007/0118909 A1 | 5/2007 | Hertzog et al. |
| 2007/0150949 A1 | 6/2007 | Futamura et al. |
| 2007/0179993 A1 | 8/2007 | Arruza |
| 2007/0239716 A1 | 10/2007 | Weininger et al. |
| 2007/0294214 A1 | 12/2007 | Santosuosso |
| 2008/0022261 A1 | 1/2008 | Gooding |
| 2008/0109423 A1 | 5/2008 | Barsness et al. |
| 2008/0215576 A1 | 9/2008 | Zhao et al. |
| 2008/0250497 A1 | 10/2008 | Mullarkey et al. |
| 2009/0070752 A1 | 3/2009 | Alpern |
| 2009/0271762 A1 | 10/2009 | Taylor et al. |
| 2010/0138919 A1 | 6/2010 | Peng et al. |
| 2010/0274768 A1 | 10/2010 | Wang et al. |
| 2011/0196855 A1 | 8/2011 | Wable et al. |
| 2011/0213754 A1 | 9/2011 | Bindal et al. |
| 2012/0016633 A1 | 1/2012 | Wittenstein et al. |
| 2012/0036580 A1 | 2/2012 | Gorny et al. |
| 2012/0130997 A1 | 5/2012 | Risvik et al. |
| 2013/0091170 A1 | 4/2013 | Zhang et al. |
| 2013/0124574 A1 | 5/2013 | Brettin et al. |
| 2013/0159251 A1 | 6/2013 | Skrenta et al. |
| 2013/0173597 A1 | 7/2013 | Do et al. |
| 2013/0290280 A1 | 10/2013 | Prahlad et al. |
| 2013/0304694 A1 | 11/2013 | Barreto et al. |
| 2013/0332931 A1 * | 12/2013 | Malewicz ................ G06F 9/54 718/102 |
| 2013/0346417 A1 | 12/2013 | Sakurai et al. |
| 2014/0012814 A1 | 1/2014 | Bercovici et al. |
| 2014/0108380 A1 | 4/2014 | Gotz et al. |
| 2014/0108421 A1 | 4/2014 | Isaacson et al. |
| 2014/0123115 A1 | 5/2014 | Peretz |
| 2014/0157370 A1 | 6/2014 | Plattner et al. |
| 2014/0188805 A1 | 7/2014 | Vijayan |
| 2014/0201171 A1 | 7/2014 | Vijayan et al. |
| 2014/0280287 A1 | 9/2014 | Ganti et al. |
| 2014/0337491 A1 | 11/2014 | Barreto et al. |
| 2015/0032684 A1 | 1/2015 | Gupta |
| 2015/0067860 A1 | 3/2015 | Levow et al. |
| 2015/0088813 A1 | 3/2015 | Lahiri et al. |
| 2015/0095351 A1 | 4/2015 | Balikov et al. |
| 2015/0178305 A1 | 6/2015 | Mueller et al. |
| 2015/0186493 A1 | 7/2015 | Balmin et al. |
| 2015/0213358 A1 | 7/2015 | Shelton et al. |
| 2015/0261776 A1 | 9/2015 | Attarde et al. |
| 2015/0261792 A1 | 9/2015 | Attarde et al. |
| 2015/0271284 A1 | 9/2015 | Hindawi et al. |
| 2015/0317340 A1 | 11/2015 | Sardina et al. |
| 2015/0317349 A1 | 11/2015 | Chao et al. |
| 2015/0347492 A1 | 12/2015 | Dickie |
| 2016/0021122 A1 | 1/2016 | Pevny |
| 2016/0036844 A1 | 2/2016 | Kopp et al. |
| 2016/0078068 A1 | 3/2016 | Agrawal et al. |
| 2016/0080410 A1 | 3/2016 | Gorny et al. |
| 2016/0085839 A1 | 3/2016 | D'Halluin et al. |
| 2016/0124663 A1 | 5/2016 | Mitkar et al. |
| 2016/0147797 A1 | 5/2016 | Dolph et al. |
| 2016/0154851 A1 | 6/2016 | Sugaya et al. |
| 2016/0154963 A1 | 6/2016 | Kumar et al. |
| 2016/0171071 A1 | 6/2016 | Beisiegel et al. |
| 2016/0306708 A1 | 10/2016 | Prahlad et al. |
| 2017/0024452 A1 | 1/2017 | Budalakoti et al. |
| 2017/0300490 A1 | 10/2017 | Kachemir et al. |

FOREIGN PATENT DOCUMENTS

| | | |
|---|---|---|
| JP | 10-269248 | 10/1998 |
| JP | 2005100392 A | 4/2005 |
| JP | 2012108635 A | 6/2012 |
| JP | 2013196565 A | 9/2013 |
| WO | 2010018178 A1 | 2/2010 |
| WO | 2010148415 A1 | 12/2010 |
| WO | 2013016620 A2 | 1/2013 |
| WO | 2013033123 A2 | 3/2013 |

* cited by examiner

| e.time | e.user_id | e.user_ip |
|---|---|---|
| 12:20 | 204595 | 192.123.123.12 |
| 12:24 | 204595 | 192.103.12.0 |
| 09:32 | 546345 | 192.103.12.0 |
| 10:11 | 546345 | 128.12.211.31 |
| 01:45 | 123411 | 192.103.12.0 |
| 05:21 | 123411 | 192.123.13.12 |

| e.time | e.user_id | e.user_ip |
|---|---|---|
| 10:11 | 546345 | 128.12.211.31 |
| 01:45 | 123411 | 192.103.12.0 |
| 09:32 | 546345 | 192.103.12.0 |
| 12:24 | 204595 | 192.103.12.0 |
| 05:21 | 123411 | 192.123.13.12 |
| 12:20 | 204595 | 192.123.123.12 |

FIGURE 2

SYSTEMS AND METHODS FOR RAPID DATA ANALYSIS

CROSS-REFERENCE TO RELATED APPLICATIONS

This application is a continuation of U.S. patent application Ser. No. 15/645,698, filed on 10 Jul. 2017, which is a continuation of U.S. patent application Ser. No. 15/077,800, filed on 22 Mar. 2016, which is a continuation of U.S. patent application Ser. No. 14/644,081, filed on 10 Mar. 2015, which claims the benefit of U.S. Provisional Application Ser. No. 61/950,827, filed on 10 Mar. 2014, all of which are incorporated in their entireties by this reference.

TECHNICAL FIELD

This invention relates generally to the data analytics field, and more specifically to new and useful systems and methods for rapid data analysis in the data analytics field.

BACKGROUND

Businesses today collect huge amounts of data relating to sales, marketing, and other critical operations. Querying this data is often a difficult and resource intensive process, especially for complex queries. To some extent, query performance can be improved by pre-calculating data aggregates and indexes, but it is infeasible to do this across all dimensions in a large dataset. Because of this, query performance issues often slow data analysis. Thus, there is a need in the data analytics field to create systems and methods for rapid data analysis. This invention provides such new and useful systems and methods.

BRIEF DESCRIPTION OF THE FIGURES

FIG. 2 is an exemplary table view of an event stream of a system of a preferred embodiment;

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Rapid Data Analysis

Figure 1:
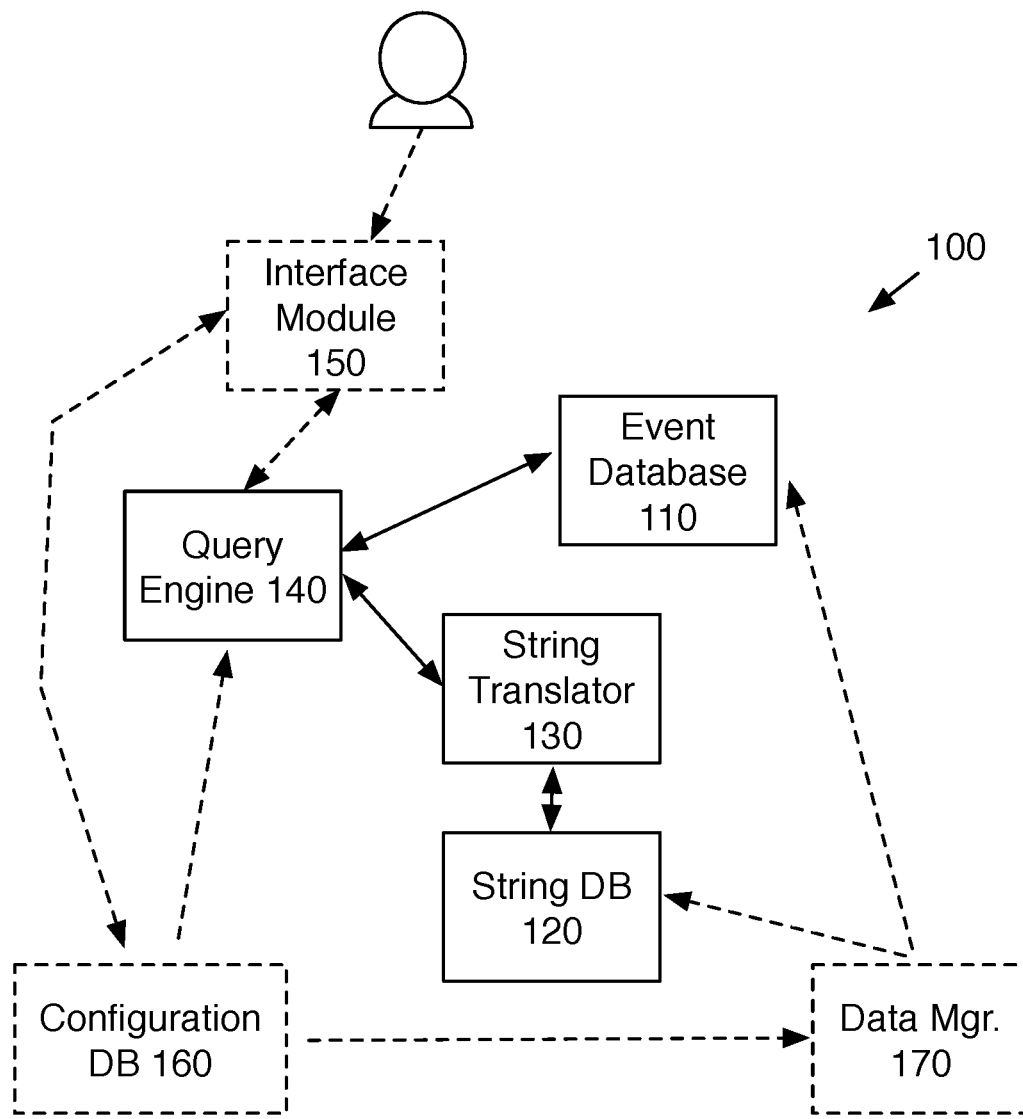
FIG. 1 is a diagram view of a system of a preferred embodiment.

As shown in FIG. 1, a system 100 for rapid data analysis includes an event database 110, a string lookup database 120, a string translator 130, and a query engine 140. The system 100 may additionally or alternatively include an interface module 150, a configuration database 160 and/or a data manager 170.

The system 100 functions to enable rapid data analysis by harnessing distributed computing to power an architecture specifically designed to enhance query speed for large volumes of data. The system 100 is preferably used for event data; each entry in the event database 110 preferably includes a timestamp and is first stored in order of that timestamp. Additionally or alternatively, each entry might include a sequence number, or some other field that indicates how events are ordered. As another alternative, event order may be determined by order of data storage. Storing the data in order of timestamp preferably allows for large amounts of real-time data to be stored without spending expensive processing time to organize and/or rewrite the data. The system 100 preferably also translates event data strings into integers using the string translator 130 and string lookup database 120, allowing for smart data compression in the event database 110. The event database 110 is preferably distributed in data shards across a distributed computing system. When the system 100 is queried, the query engine 140 preferably takes samples from data shards across the distributed computing system, allowing for fast parallel reads. The query engine 140 can then preferably determine a query answer based in part on the selected samples, enabling a much quicker response than if all data were queried. The query engine 140 can preferably adjust the query engine's sampling methodology to achieve a desired ratio of accuracy to speed to make the query engine 140 adaptable to a wide variety of query types. Utilizing the above-mentioned features at least in part, the system 100 preferably enables quick analysis of large amounts of data while minimizing or eliminating extensive pre-processing or overhead.

The event database 110 functions as the main information store for the system 100. The event database 110 preferably stores event data, e.g. data that includes a time element or other indication of event order. The event data preferably has at least an associated time field and a session field, but may contain any suitable set of fields. The event database no may additionally or alternatively store any suitable data in any suitable organizational schema. The event database no preferably includes multiple datasets to store data in different ways. For example, as shown in FIG. 2, one dataset may include a list of events grouped (e.g., sharded) by user-id (UID) and organized by time; while another dataset may include the same list of events, but grouped by IP address and organized by time. Data sharding is preferably used to partition and/or group data, but data may additionally or alternatively be grouped in any suitable manner. Different datasets may store identical data, as in the above example, but different datasets may also store different subsets of the same data, or different data entirely. For example, one dataset may include a list of events grouped by UID and organized by time, where the events also include IP address and location fields. A second dataset may include a list of the same events, grouped by IP address and organized by time, but the event information does not include a location or UID. The event database no preferably organizes all datasets as columnar datasets; alternatively, datasets may be organized in any suitable manner. Datasets stored in a columnar format preferably use columnar compression to reduce the size of data stored. Columnar compression preferably includes any technique using the sequential nature of data stored in columns to save space.

The event database no preferably allows the storage of both explicit and implicit data. Implicit data preferably includes implicitly attached object data sources and may be referenced in queries. For example, in an event stream of sweater sales data, each event could carry explicit data fields that identify the merchant ("e.merchant_id"), terminal ("e.terminal_id"), dollar amount of the transaction ("e.dollar_amount"), and the sweater type sold ("e.sweater_id"). Each event may also have object data sources or other types of implicit data that associate with these explicit data fields; for example, there may be an object data that associates with each "e.sweater_id" properties relating to the sweater type, like size ("sweater_size") and color ("sweater_color"). The event database 110 preferably makes these associated data properties automatically available for queries; for example, the sweater color might be accessed by the field "e.sweater_id.sweater_color". The event database no can include direct access to the attribute fields, which can function to remove the need for table joins. Access to the attribute fields may be facilitated by importing tables declared as join tables. Declaring join tables preferably allows the join tables to be linked with the dimension of a related event data table. Join tables are preferably stored as attribute name-value pairs.

The event database 110 is preferably distributed across computers in a distributed computing system. Each node of the distributed computing system preferably stores a part of the data contained by the event database no. This data is preferably stored in persistent memory (e.g. hard disk drives, flash memory), but some or all of the data may be additionally or alternatively stored in temporary memory (e.g. RAM). The data in the event database 110 is preferably further partitioned into data shards on each node. Shards are preferably both horizontal and vertical table partitions; data shards are preferably formed from the intersection of a subset of all rows and a subset of all columns of a data table. Each shard preferably contains at least time information, but may additionally or alternatively contain other information. Shards can be partitioned by time; for example, each data shard may contain a set of events that occurred over a particular 24 hour period. Shards may additionally or alternatively be partitioned by any other suitable information (e.g. UID, IP address, session ID, etc.). Shard partitioning is preferably done by the following rules: vertical partitions preferably include a fixed number of fields, and there are a fixed number of horizontal partitions for each vertical partition. For example, if a dataset includes a time field, a UID field, an IP address field, and a location field, the dataset may be vertically partitioned into three. The first vertical partition would include the time field and the UID field; the second would include the time field and the IP address field, and the third would include the time field and the location field. Then the dataset would be horizontally partitioned by day; if there is one week of data, this would be seven horizontal partitions. Thus, the data would be partitioned into twenty-one shards. Shard partitioning may additionally or alternatively be done automatically by any other rule set or algorithm or may be done manually.

Each shard preferably has a shard number (or other identifier), and each shard number is preferably stored, along with the node on which the shard exists, in the configuration database 160. This linked data may be additionally or alternatively stored in any suitable location. Keeping a central list of shard and node links preferably enables the query engine 140 to determine the right node to query for particular data. The list of shard/node links may additionally include other information, such as a summary of data included in the shard.

The string lookup database 120 functions to store information linking strings to integers that uniquely identify the strings. The string lookup database 120 is used by the string translator 130 to translate strings to their respective integer identifiers and vice versa. The mapping of strings to identifiers in the string lookup database 120 is preferably stored in a manner that enables prefix matching (e.g. by use of a trie data structure), but may additionally or alternatively stored in any suitable manner. The string lookup database 120 is preferably distributed across computers in a distributed computing system. Each node of the distributed computing system preferably stores a part of the data contained by the string lookup database 120. This data is preferably stored in persistent memory (e.g. hard disk drives, flash memory), but some or all of the data may be additionally or alternatively stored in temporary memory (e.g. RAM). The data in the string lookup database 120 is preferably further partitioned into data shards on each node. The data shards of the string lookup database 120 preferably correspond to data shards of the event database 110, but may alternatively be partitioned independent of the partitioning of the event database no.

Each field of the event database 110 preferably corresponds to independent string lookup data shards of the string lookup database 120. This enables the same integer identifiers to be used for different strings in different fields. The relationship between a string lookup data shard and a corresponding event database 110 field is preferably stored in the configuration database 160, but may alternatively be stored in any suitable location. If the string lookup data shards correspond to event data shards, the relationship may simply be that the two shards share a shard identifying number. The relationship between string lookup shards and event database 110 fields is preferably one-to-one, but alternatively may be any suitable relationship; for example, if two fields contain similar string data, (e.g. middle name and first name), they may share a string lookup shard.

The string translator 130 functions to convert strings in incoming event data to integer identifiers. Converting strings to integer identifiers can greatly save in the amount of space required to store event data, and can also optimize certain operations (preferably including operations used by the query engine 140). The string translator 130 preferably translates strings in received event data to string identifiers before event data is written to the event database 110, but may additionally or alternatively translate the strings to string identifiers at any suitable time. The string translator 130 preferably translates all strings in received event data, but may alternatively only translate a subset of all strings in received event data. The string translator 130 preferably translates a string by looking up an identifier corresponding with the string in the string lookup database 120. The corresponding identifier is preferably an identifier linked to the specific string, but the corresponding identifier may additionally or alternatively be linked to other data. For example, an identifier might only correspond to a string if the string has a particular value and the string is part of a particular field or type of event data. This enables identifiers to be reused for different data types; for example, the integer identifier "42" might correspond to the string "Canada" for data in a "Country" field and might correspond to the string "January" for data in a "Month" field. This "other data" may be explicitly present in the string lookup database 120 or may be implicitly present; for example, string lookup data may be stored in a different location (as described in the section on the string lookup database) if the string lookup data corresponds to a different event data field.

If the string has a corresponding identifier in the string lookup database 120, the string is translated into that identifier before being written into the event database 110. If the string does not have a corresponding identifier, a corresponding identifier is preferably created for the string. The corresponding identifier is preferably the next available identifier in the string lookup database 120; but may alternatively be chosen according to the string value. For example, all string values beginning with the letters a, b, or c may have an integer identifier starting with a "1". If identifiers are chosen according to string value, identifier lookup data is preferably stored in a format that enables prefix matching.

The string translator 130 also functions to handle string translation for queries. When the query engine 140 receives a query, the strings in the query are preferably passed to the string translator 130 to be translated into identifiers. The query is preferably then processed using the identifiers. After the query has been processed, identifiers in the query result are preferably processed back into strings by the string translator 130, allowing the query results to be viewed or processed without further intervention from the string translator 130.

The query engine 140 functions to process incoming queries on event data and return results of the queries. The query engine 140 preferably takes in queries that include event data sources, time ranges, filters, partition functions, and metric functions. Event data sources are preferably references to event data fields in the event database 110; for example, "e.sweater_id" might refer to an event data field corresponding to a type of sweater sold. Time ranges are ranges of time over which a query should be searched; queries preferably ignore event data for which the "e.time" value is outside the specified time ranges. Filters preferably allow data to be included or excluded from a query based on a filtering condition; filters are preferably applied to any event data that satisfies the time ranges, but may additionally or alternatively be applied to any other event data. Any event data that does not satisfy the filters is preferably excluded from query results. In this way, the time range is preferably similar to other filters, except in that the time range preferably has higher priority than other filters. For example, if a set of filters includes a filter that states "e.sweater_id>10", "Filter(e)" would return "False" for any events "e" with "e.sweater_id≤10". Partition functions are preferably evaluated for any event data that satisfies both time ranges and filters, but may additionally or alternatively be applied to any other event data. Partition functions preferably group events together by satisfaction of one or more relations. The partition function preferably returns all events that satisfy the partition function; for example, "partition(e.sweater_id, 23)" would return all events containing that satisfy "e.sweater_id=23". Metric functions preferably produce statistical data from partition functions. Metric functions preferably include functions that produce a sum, percentile, proportion and/or percentage of event data that satisfies a given condition. If the results of a partition function are interpreted as a representative sample from a broader population, metrics may be considered as sample-based estimates of the corresponding broader population metrics. In these cases, the query engine 140 preferably provides confidence bands for the estimates, equivalent to such as may be obtained by statistical bootstrapping. Confidence bands are preferably calculated through analysis of observed statistical distributions, but may additionally or alternatively be provided in any suitable manner. Users may be provided with confidence bands as an indicator of confidence; for example, a user may be notified of suspected sample bias if confidence is low.

In addition to returning events and metrics, the query engine 140 may additionally or alternatively return objects and/or groups of objects (called cohorts). For example, a query may request the set of "terminal_id" values for events that satisfy the partition function "partition(e.sweater_id,23)". Cohorts may include behavioral cohorts; e.g., a group of users satisfying a particular sequence of events. For example, the group of users that were active on a particular website for more than ten hours over a one-week timespan.

Queries may additionally or alternatively include ordering and/or grouping functions. Ordering functions preferably allow for ordering of query results. Ordering functions are preferably applied to final results, but may additionally or alternatively be applied to intermediate results (for example, if ordered results are necessary for a calculation in a query step). Grouping functions preferably allow for grouping of query results. Similar to ordering functions, grouping functions are preferably applied to final results, but may additionally or alternatively be applied to intermediate results. Ordering and grouping functions are preferably specified or selected in a first pass (e.g., during generation of the first intermediate results), but may additionally or alternatively be specified at any suitable time. Grouping functions may additionally include cohort functions. Cohort functions are a specific case of grouping functions that divide a population of objects into a set of cohorts, with each object appearing in exactly one cohort.

The query engine 140 preferably processes queries by first pre-processing the query; this includes parsing the query and translating strings in the query to integers using the string translator 130. Pre-processing may additionally or alternatively include performing user authentication, user-friendly string resolution (e.g. resolving "now" into a current timestamp), and parsing SQL-like query strings into a query tree. Pre-processing preferably also includes resolving where data relevant to the query resides (either via calculation or a lookup to the configuration database 160), performing error handling, scaling, table joins, and/or any math necessary to evaluate the query.

After pre-processing the query, the query is preferably evaluated using a multiple pass method. On the first pass, the query engine 140 preferably takes small samples from a large number of data shards in the event database no simultaneously. The query engine 140 preferably then performs intermediate calculations on the samples to identify or refine potential query results. This set of potential query results is then used as input for a next pass. The next pass may be another identification/refining pass (similar to the first pass, but with a different input), or the next pass may be a final pass. The final pass preferably includes full scans of data shards containing suspected relevant information to the query, but may additionally or alternatively include only partial scans of data shards. Query results are preferably calculated from the results of the final pass.

For example, the query engine 140 receives a query to identify the top 100 most active users over the past month for a particular website. In the first pass, the query engine 140 queries data shards of the event database no (which is distributed across many nodes of a distributed computing system) containing user id and activity data and on each node attempts to identify the top users from small samples of the data. The query engine 140 then compares the results of the first pass, and comes up with a list of the top 10,000 users estimated from the data samples. The query engine 140 then does a full scan of all data shards containing data on those 10,000 users, and from this list determines the top 100 users.

The number of passes is preferably assigned manually and defaults to two passes, but may additionally or alternatively be set automatically. The sampling method (including how much data is sampled in each pass and how samples are chosen in each pass) is preferably determined automatically according to a desired confidence interval and level. For example, the samples chosen for a population estimate desired to be within a particular confidence interval at a particular confidence level would preferably be chosen randomly; the number of samples corresponding to the minimum number required for such a confidence interval and level. The sampling method may additionally or alternatively include sampling other than random sampling for data known to not be normally distributed and/or not comprised of independent and random variables. For example, if a set of data is generally known to follow a particular distribution (either from past queries or other data sources), the set of data may be sampled according to that particular distribution.

In one embodiment of the invention, the query engine 140 may take a speed/accuracy variable as part of a query or as a general setting applied to queries (preferably stored in the configuration database 160). This speed/accuracy variable would preferably adjust the number of passes and/or number of samples taken to produce a result. For example, a query with the speed/accuracy variable set close to the "maximum speed" value might take a very small number of samples, but might also potentially return inaccurate answers. As the speed/accuracy variable is adjusted toward the "maximum accuracy" side, the query takes more time and/or processing power, but returns more accurate results. The query engine 140 of this implementation may additionally or alternatively include a query estimator. The query estimator preferably produces for a particular query and speed/accuracy variable an estimate of how long the query will take and how accurate the results of the query will be. The query estimator could preferably be used either directly (e.g., by a query engine user setting a desired time and/or accuracy and receiving a particular speed/accuracy variable setting) or indirectly (e.g., query engine users can evaluate the time/accuracy of the query for different speed/accuracy variable settings to select the right speed/accuracy variable setting).

The interface module 150 functions to provide a graphical user interface to the system 100. The interface module 150 preferably provides ways for users of the query engine to view and edit data, build queries, and/or visualize query results. The interface module 150 preferably also enables the seamless introduction of join tables; data from join tables are preferably automatically shown as columns of the event data, but may additionally or alternatively be represented in any suitable manner. The interface module 150 preferably includes a metrics tab, a derived fields tab, an explore tab, and/or a cohorts tab.

The metrics tab preferably allows query engine users to define, name, and edit metrics. The metrics tab may include a toolbox of standard metrics that customers may run on data; additionally or alternatively the metrics tab may include metrics automatically generated based on event data fields and/or content present in the event database no. For example, if event data includes a "page" field and a "user" field, an automatically generated metric calculating the number of events where the value of the "page" field is "photo_view" divided by the unique count of users from the "user" field might be present in the metrics tab.

The derived fields tab preferably allows query engine users to create derived fields for event data. The derived fields tab preferably shows existing event database 110 fields in addition to providing options to create new (derived) fields from the existing fields. Derived fields are preferably fields calculated from data in other fields. For example, "Profit" might be a field derived from "Revenue" minus "Expenses". Derived fields may only exist within the interface module 150, or may exist as a relationship in the event database no (so queries would calculate derived fields at run-time), or may exist as stored data within the event database no (i.e. the values of the derived fields are calculated in advance).

The explore tab preferably allows query engine users to interact with event data in the event database no. The explore tab preferably allows query engine users to apply combinations of basic functions (such as count, unique count, sum, etc.), metrics, and filters to event data. For example, a query engine user could calculate the sum of two metrics on filtered data, with different scalings (e.g., "2*Metric1(Filter (event_data))+Metric2(Filter(event_data))"). The explore tab may additionally or alternatively include an area where event data and calculations based therein can be visualized or shown either on example data or on actual data in the event database no.

The cohorts tab preferably allows query engine users to group event data objects into categories; for example, dividing members of a website into cohorts based on site activity. The cohorts tab preferably allows query engine users to specify categories in which to divide objects. Additionally or alternatively, the cohorts tab may automatically create categories in which to divide objects. For example, the cohorts tab may automatically create cohorts based on the number of days per week a website member logged in; website members would be divided into one of eight categories (0, 1, 2, 3, 4, 5, 6, or 7 days logged in). The cohorts tab preferably includes a set of frequently used cohort functions (like grouping by time) to aid query engine users in generating cohorts. The cohorts tab preferably additionally allows query engine users to define object properties. Object properties are preferably defined based on sequences of event data and are preferably formed from a combination of aggregation functions, aggregation arguments, and filters. For example, an "hours_active" object property might be calculated by "count_unique(align_time(event.time,3600)) ". The cohorts tab may additionally or alternatively allow query engine users to view or modify pre-defined object properties (for example, a sign-up timestamp).

The configuration database 160 functions to store settings pertaining to the operation of the system 100. The configuration database 160 preferably stores mappings between event data shards in the event database no and nodes in the distributed computer system. The configuration database 160 may additionally or alternatively store other information about the event data shards (for example, their content, or the mapping between event data shards and event data fields). The configuration database 160 preferably also stores mappings between string data shards in the string lookup database 120 and nodes in the distributed computer system. The configuration database 160 may additionally or alternatively store other information about the string data shards (for example the mapping between string data shards and event data shards or the mapping between string data shards and event data fields). The configuration database 160 preferably also stores general settings pertaining to the operation of the system 100, for example, the configuration database 160 may store global settings related to queries (like the speed/accuracy tradeoff variable). The configuration database 160 may also store global settings related to storing or parsing data.

In a variation of a preferred embodiment, metadata (e.g., mappings between data shards and nodes, etc.) may be stored in a separate metadata store, while the configuration database 160 may store only other settings (e.g., global settings related to queries).

The data manager 170 functions to maintain or modify data in the event database no to maximize the performance of the system 100. The data manager 170 preferably determines how datasets are organized and whether new datasets should be generated from existing data. The data manager 170 may do this based on manual input from a query engine user, based on a set of rules or other algorithm in response to stored data and/or based on a set of rules or other algorithm in response to queries. For example, the data manager 170 may create a dataset including a list of events grouped by IP address and sorted by time in response to a query engine user command. The data manager 170 may then automatically create a dataset including the same events, but now grouped by location, based on a rule in the configuration database 160 stating that if a dataset exists grouping data by IP address another one should be created grouping data by location. If the query engine user makes repeated queries about users of a particular website, the data manager 170 may recognize that having this data be sorted by UID may be advantageous, and would then generate a dataset including the same events, but grouped by UID. Likewise, if the data manager 170 notices a particular dataset is rarely used, the data manager 170 may remove that dataset or organize the data set differently.

The data manager 170 preferably also controls how shards are encoded in the event database 100. The data manager 170 preferably partitions shards as described in the sections covering the event database no. The data manager 170 preferably partitions or repartitions shards in order to optimize system 100 performance. The data manager 170 may do this based on manual input from a query engine user, based on a set of rules or other algorithm in response to stored data and/or based on a set of rules or other algorithm in response to queries.

The data manager 170 preferably also generates data aggregates in order to optimize system 100 performance. Data aggregates are preferably formed by performing sums, averages, or other mathematical operations on event data. Data aggregates preferably anticipate operations performed by common queries in order to save time or processing power when these queries are called. The data manager 170 may create data aggregates based on manual input from a query engine user, based on a set of rules or other algorithm in response to stored data and/or based on a set of rules or other algorithm in response to queries.

Figure 3:
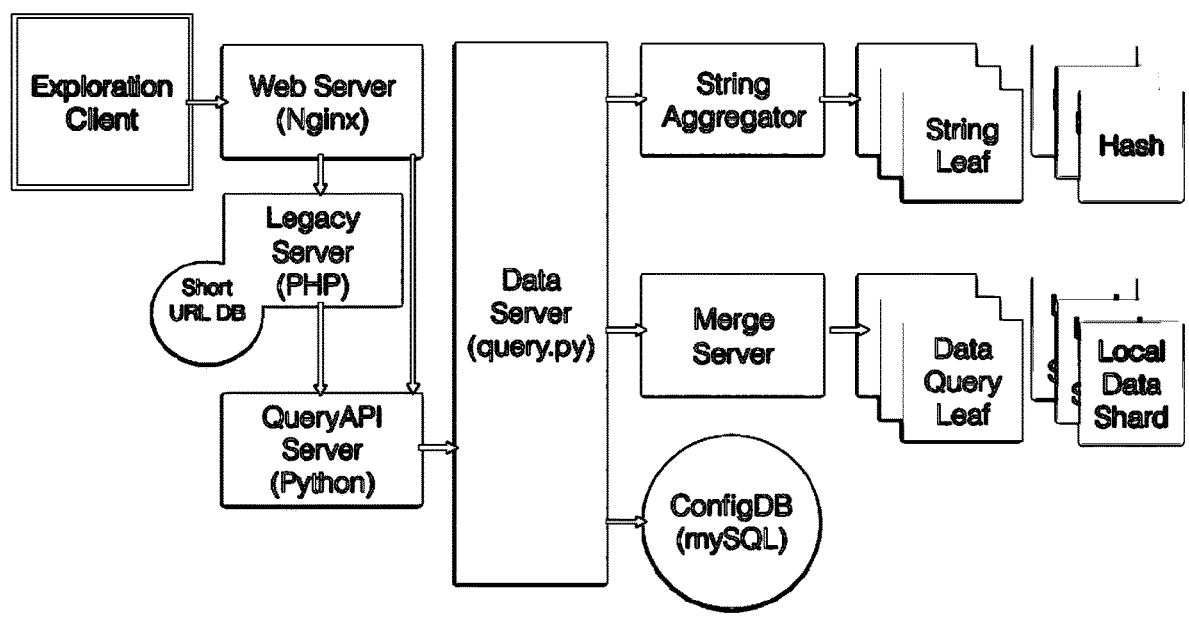
FIG. 3 is a diagram view of an example implementation of a system of a preferred embodiment.

As shown in FIG. 3, in an example implementation of the system 100, a query is initiated by the interface module 150. The query is then received by a Nginx web server for SSL termination, passes through legacy PHP code in the Legacy server, then a query API server for user authentication, user-friendly string resolution, and query parsing (e.g. parsing an SQL-like string into a query tree). The query is then processed by the query engine 140 (data server). The query engine processes the query using data from the string translator 130 (string aggregator) and a merge server, which access the string lookup database 120 (string leaves/hashes) and the event database no (data query leaves/local data shards) respectively. The query results are then returned to the interface module 150 through the same server path.

2. Method for Rapid Data Analysis

Figure 4:
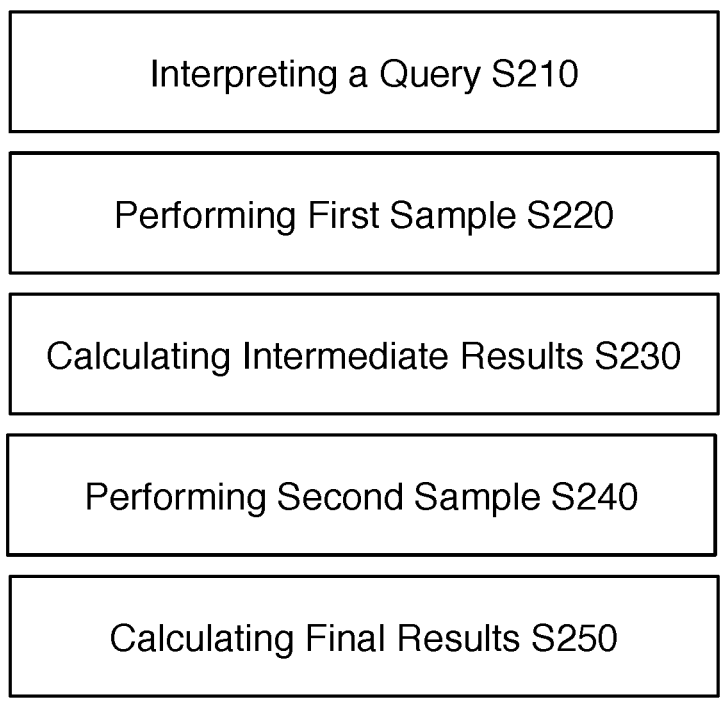
FIG. 4 is a chart view of a method of a preferred embodiment.

As shown in FIG. 4 a method 200 for rapid data analysis includes interpreting a query S210; performing a first data sample based on the query S220; calculating intermediate query results from the data sample S230; performing a second data sample based on the intermediate query results S240; and calculating final query results based the second data sample S250. The method 200 is preferably implemented by the system 100 described above, but may additionally or alternatively be implemented by any suitable system.

The method 200 preferably functions to enable rapid data analysis by harnessing distributed computing to sample many datasets simultaneously and return results from these datasets without having to search their entirety. The multi-pass query process of the method 200 preferably allows potentially relevant data to be identified quickly (via S220 and S230) and then targeted for further analysis (S240 and S250), preventing time from being wasted on irrelevant data. The scope of each step is preferably adjustable, allowing queries to be optimized, enhanced or otherwise improved for the ideal ratio of speed to accuracy. Through these steps, the method 200 preferably enables quick analysis of large amounts of data without extensive pre-processing or overhead.

Interpreting a query S210 functions to identify how data should be queried. Queries interpreted by S210 are preferably substantially similar to those described in the system 100 description. Interpreting the query S210 preferably includes first pre-processing the query, which can include parsing the query and translating strings in the query to integers. Translating strings in the query to integers preferably includes passing the string (and potentially other data, such as the referenced data field) to a database containing a mapping of strings to identifiers (e.g. the string lookup database 130). Pre-processing may additionally or alternatively include performing user authentication, user-friendly string resolution (e.g. resolving "now" into a current timestamp), and parsing SQL-like query strings into a query tree. Pre-processing preferably also includes resolving where data relevant to the query resides (either via calculation or a lookup to a configuration database), performing error handling, scaling, table joins, and/or any math necessary to evaluate the query.

Step S210 may additionally include specifying or selecting grouping and/or ordering functions. Ordering functions preferably allow for ordering of query results. Ordering functions are preferably applied to final results, but may additionally or alternatively be applied to intermediate results (for example, if ordered results are necessary for a calculation in a query step). Grouping functions preferably allow for grouping of query results. Similar to ordering functions, grouping functions are preferably applied to final results, but may additionally or alternatively be applied to intermediate results. Grouping functions may additionally include cohort functions. Cohort functions are a specific case of grouping functions that divide a population of objects into a set of cohorts, with each object appearing in exactly one cohort.

Performing a first data sample based on the query S220 functions to identify and sample data to be used by S230. Performing a first data sample S220 preferably includes identifying data to be sampled. Identifying data to be sampled preferably includes identifying data to be sampled based on a desired confidence interval and level, for example, the data to be sampled chosen for a population estimate desired to be within a particular confidence interval at a particular confidence level would preferably be chosen randomly; the number of samples corresponding to the minimum number required for such a confidence interval and level. Identifying data to be sampled may additionally or alternatively include sampling other than random sampling for data known to not be normally distributed and/or not comprised of independent and random variables. For example, if a set of data is generally known to follow a particular distribution (either from past queries or other data sources), the set of data may be sampled according to that particular distribution. Performing a first data sample S220 preferably also includes collecting the first data sample to be analyzed by S230. Collecting the first data sample preferably includes taking small samples from a large number of data shards contained on many nodes of a distributed computing system. This preferably enables a large number of parallel reads to occur simultaneously, saving time.

Calculating intermediate query results from the first data sample S230 functions to provide a first estimate of query results, which can then be used to direct a second data sampling. The query processed by S210 is preferably run on the first data sample to determine a set of intermediate query results. The intermediate query results are preferably then used to determine a second data sample. For example, if a query seeks to identify the top 100 most active users over the past month for a particular website; performing a first data sample S220 might include sampling data shards on many distributed computing system nodes containing user id and activity data. Calculating intermediate query results S230 might include attempting to identify the top users on each node from small samples of those data shards, comparing those top users, and coming up with a list of the top 10,000 users estimated from the data samples.

Performing a second data sample based on the intermediate query results S240 functions to identify and collect data based on the results of S230. Performing a second data sample S240 preferably includes identifying data sources for the intermediate query results, and then collecting all available data from those sources. Additionally or alternatively, S240 may include only collected a subset of all available data sources. Referring to the example of the previous section, identifying data sources and collecting all available data would include locating all activity data (in the queried time frame) related to the predicted top 10,000 users (the data sources), and collecting this activity data for calculations in S250.

Steps S230 and S240 may be repeated on successive data sets; for example, intermediate query results may be calculated from the second data sample in order to generate a third data sample, etc. Likewise, Step S250 may be performed on any suitable data sample.

Calculating final query results based on the second data sample S250 functions to determine query results based on the second data sample identified in S240. Calculating final query results S250 preferably includes running the query processed by S210 on the second data sample and returning the results. Calculating final query results S250 may additionally or alternatively include returning a confidence interval, confidence level, or other estimation of the accuracy of the final query results.

The methods of the preferred embodiment and variations thereof can be embodied and/or implemented at least in part as a machine configured to receive a computer-readable medium storing computer-readable instructions. The instructions are preferably executed by computer-executable components preferably integrated with a computer system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for rapid data analysis, comprising a set of distributed non-volatile memory collectively storing a dataset of data from a plurality of data sources, wherein each non-volatile memory stores a set of data shards, wherein each data shard stores a subset of the dataset, the system configured to:
   receive a query;
   interpret the query, comprising identifying a first set of data shards containing data relevant to the query;
   determine a first data sample from the first set of data shards;
   calculate an intermediate result to the query based on the first data sample;
   determine a set of query-relevant data sources based on the intermediate result;
   identify a second set of data shards from the set of query-relevant data sources;
   determine a second data sample from the second set of data shards; and
   calculate a final result to the query based on the second data sample.

2. The system of claim 1, wherein the second set of data shards contains data distinct from the data contained in first set of data shards.

3. The system of claim 1, further configured to determine confidence information for an accuracy of the final result.

4. The system of claim 1, wherein interpreting the query further comprises translating a string of the query to a set of integers.

5. The system of claim 1, wherein the query includes a time range and an event data source.

6. The system of claim 1, wherein the first set of data shards and the second set of data shards comprise explicit and implicit data.

7. The system of claim 1, wherein the first data sample is identified after receipt of the query.

8. The system of claim 1, wherein the first set of data shards is distributed across the set of distributed non-volatile memory; and wherein the first data sample is identified by simultaneously performing a plurality of parallel reads on the set of distributed non-volatile memory.

9. A system for rapid data analysis comprising a set of non-volatile memory collectively storing a dataset, wherein each non-volatile memory within the set stores a set of data shards, wherein each data shard stores a distinct subset of the dataset, the system configured to:
   receive a query;
   identify a first set of data shards containing data relevant to the query;
   identify a first data sample from the first set of data shards;
   determine a first intermediate result to the query based on the first data sample;
   perform a non-zero number of intermediate searches, wherein each intermediate search comprises:
       identifying an additional set of data shards based on at least one of the first intermediate result and additional intermediate results;
       identifying additional data samples from the additional set of data shards; and determining additional intermediate results based on the additional data samples; and determine a final result to the query.

10. The system of claim 9, further configured to determine confidence information for each additional intermediate result; and wherein the non-zero number of intermediate searches are performed until the confidence information exceeds a confidence threshold.

11. The system of claim 9, wherein the query comprises a variable that represents a size of the first data sample.

12. A system, comprising:
an event database comprising a set of non-volatile memory collectively storing a dataset within a plurality of data shards, wherein each data shard stores a subset of the dataset, the comprising event data and associated sequence identifiers, wherein the event data is organized based on the associated sequence identifiers; and
a query engine, configured to:
receive a query;
calculate an intermediate result to the query based on analysis of a first data sample, wherein the first data sample is determined from a first set of data shards of the plurality of data shards;
identify a set of query-relevant data sources based on the intermediate result;
identify a second set of data shards from the plurality of data shards using the set of query-relevant data sources;
identify a second data sample from the second set of data shards; and
calculate a final result to the query based on the second data sample.

13. The system of claim 12, wherein each sequence identifier is a timestamp.

14. The system of claim 12, further comprising a string translator configured to translate strings into respective string identifiers; wherein the query engine is further configured to determine a set of string identifiers associated with the query using the string translator.

15. The system of claim 14, wherein the set of string identifiers are numerical identifiers.

16. The system of claim 14, further comprising a string lookup database configured to store a mapping of strings to string identifiers, wherein the mapping enables prefix matching.

17. The system of claim 12, further comprising a configuration database configured to store shard mapping data; wherein the second set of data shards is identified from the set of query-relevant data sources using the shard mapping data.

18. The system of claim 12, wherein the query comprises a query field that does not correspond to a stored data field within the event database.

19. The system of claim 18, wherein the intermediate result is calculated by:
determining a derived field based on the query field based on the stored event data of the event database; and
determining the intermediate result based on the derived field.

20. The system of claim 12, wherein the event database comprises a columnar dataset.

* * * * *